United States Patent

Takayama

Patent Number: 5,961,624
Date of Patent: Oct. 5, 1999

[54] CONNECTION APPARATUS WHICH FACILITATES CONFLICT-FREE INTERFACING BETWEEN HOST APPARATUSES AND ONE OR MORE PERIPHERALS

[75] Inventor: Makoto Takayama, Yokohama, Japan

[73] Assignee: Canon Kabushiki Kaisha, Tokyo, Japan

[21] Appl. No.: 08/623,304

[22] Filed: Mar. 28, 1996

[30] Foreign Application Priority Data

Mar. 30, 1995 [JP] Japan .................................. 7-073182
Mar. 14, 1996 [JP] Japan .................................. 8-057560

[51] Int. Cl.[6] .................................................. G06F 13/14
[52] U.S. Cl. ........................................... 710/129; 395/500
[58] Field of Search .................................. 395/500, 309, 395/306, 308, 200.01, 200.02, 200.2, 825, 826, 840, 835, 837, 838, 872, 882, 856, 859, 311; 710/126, 128, 129, 5, 6, 20, 15, 17, 18, 36, 39, 52, 62, 131; 709/200, 201

[56] References Cited

U.S. PATENT DOCUMENTS

| | | | |
|---|---|---|---|
| 4,418,382 | 11/1983 | Larson et al. ........................... | 395/882 |
| 4,837,680 | 6/1989 | Crockett et al. ........................ | 395/284 |
| 5,280,585 | 1/1994 | Kochis et al. .......................... | 395/868 |
| 5,307,462 | 4/1994 | Hastings ................................. | 395/830 |
| 5,323,393 | 6/1994 | Barrett et al. ........................ | 370/85.8 |
| 5,386,517 | 1/1995 | Sheth et al. ............................ | 395/880 |
| 5,499,378 | 3/1996 | McNeill, Jr. et al. ................. | 395/500 |

Primary Examiner—Glenn A. Auve
Attorney, Agent, or Firm—Fitzpatrick, Cella, Harper & Scinto

[57] ABSTRACT

In the case where one peripheral apparatus is shared by a plurality of host computers via an SCSI interface, an interface apparatus is provided between the plurality of host computers and the peripheral apparatus. When the first host computer and the peripheral apparatus are connected, the interface apparatus monitors whether a selection to the peripheral apparatus has been issued from the second host computer or not. When the selection is issued, a status of "Busy" is returned as a response to the second host computer. The interface apparatus simultaneously monitors whether the first host computer has released a use right of the peripheral apparatus or not. Even if the first host computer doesn't release the use right of the peripheral apparatus, so long as there is no access for the predetermined time, the second host computer and the peripheral apparatus are connected in response to the selection or the like to the peripheral apparatus from the second host computer.

102 Claims, 10 Drawing Sheets

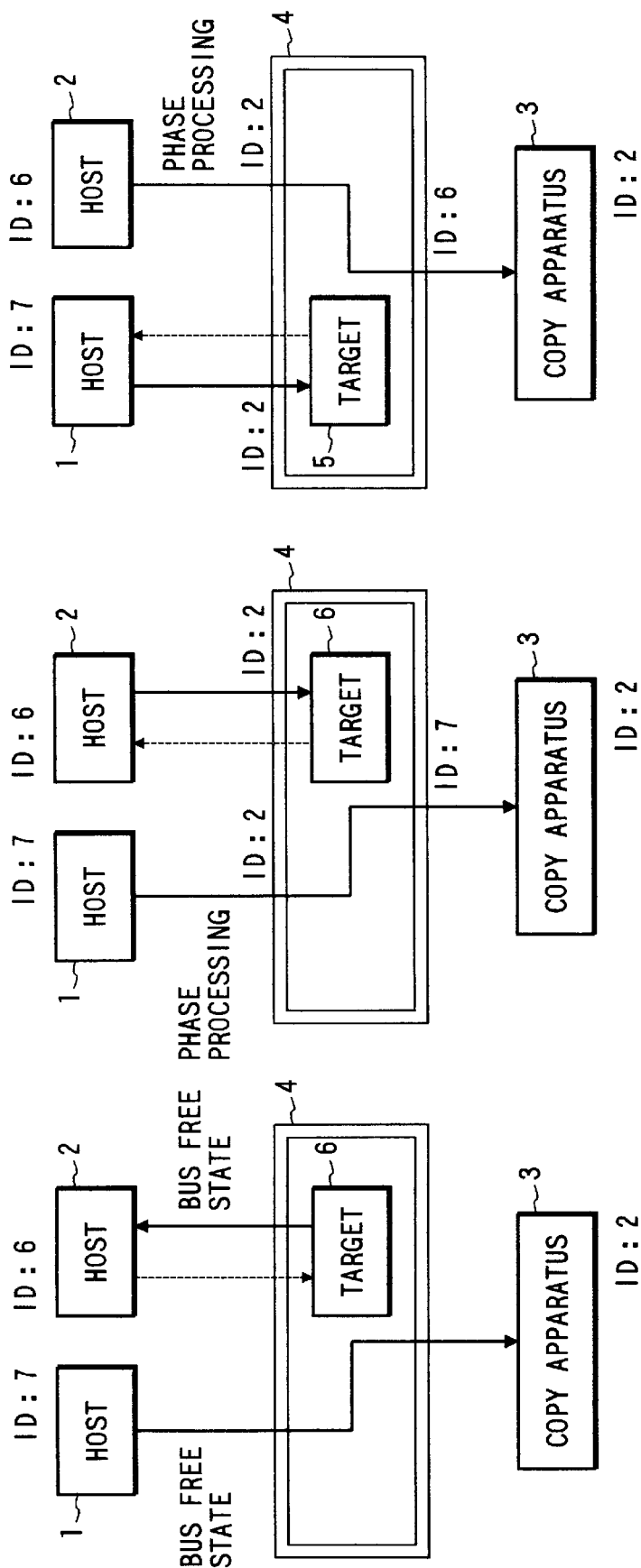

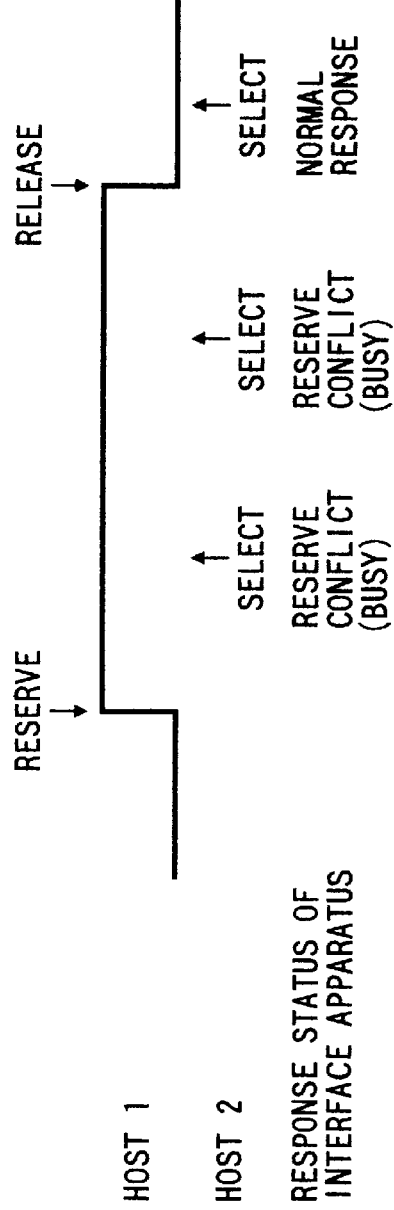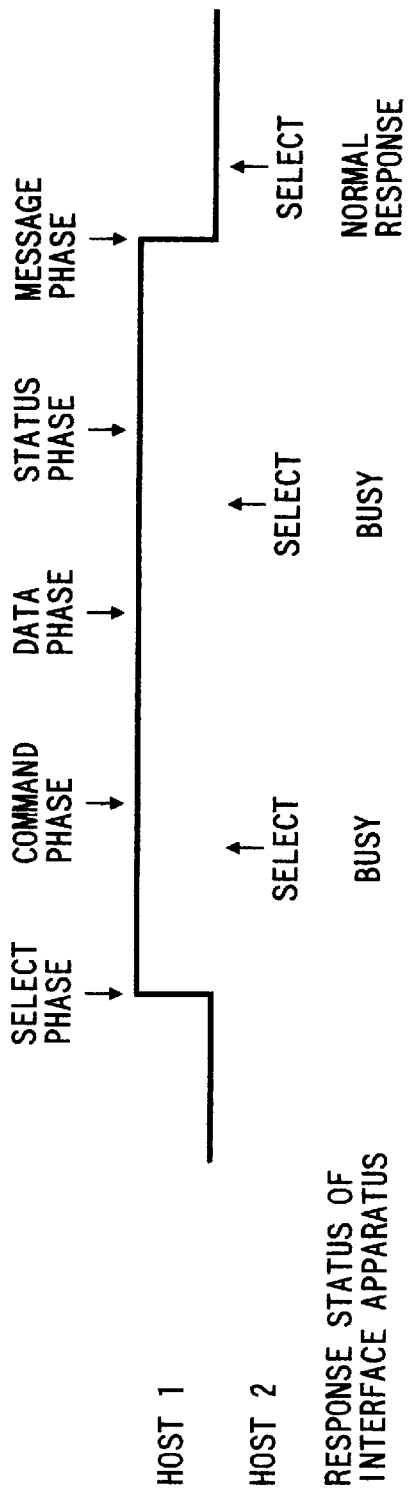

CONNECTION APPARATUS WHICH FACILITATES CONFLICT-FREE INTERFACING BETWEEN HOST APPARATUSES AND ONE OR MORE PERIPHERALS

BACKGROUND OF THE INVENTION

1. Field of the Invention

The invention relates to an interface apparatus which is preferably applied to, for example, an SCSI interface or the like and, more particularly, to an interface apparatus to which a plurality of information processing apparatuses are connected and mutual information transmission and reception and connecting relations are switched.

2. Related Background Art

Hitherto, up to eight apparatuses each having an SCSI interface can be connected to an SCSI bus. Generally, one initiator (master) and up to seven targets (slaves) are connected and the targets execute processing operations on the basis of a command of the initiator.

However, in the case where a plurality of apparatuses serving as initiators exist on one SCSI bus and share one target (copy apparatus here) as in the case where, for example, as shown in FIG. 11, a plurality of host computers (hereinafter, referred to as hosts) 21 and 22 and a peripheral apparatus 23 such as a copy apparatus, a printer or the like are connected to the SCSI bus in the above conventional example and the copy apparatus 23 is shared and used from the plurality of hosts 21 and 22, there are the following problems.

In many cases, the host is designed so as to exclusively use the peripheral apparatus. There is a situation such that the host issues a reserve command to the peripheral apparatus and does not release. When one host reserves the peripheral apparatus, there occurs a problem such that even if the other host tries to access to the peripheral apparatus, a "reservation conflict" status is merely returned and the peripheral apparatus cannot be used.

SUMMARY OF THE INVENTION

It is an object of the invention to provide an interface apparatus in a system such that a plurality of hosts share a peripheral apparatus, wherein even if one host reserves the peripheral apparatus, the peripheral apparatus can be used from another host.

Another object of the invention is to provide an interface apparatus in which in the case where a peripheral apparatus which was reserved by one host is enabled to be used by another host, such a fact can be notified to such another host.

Still another object of the invention is to provide an interface apparatus in an interface such as an SCSI interface in which the number of apparatuses which can be connected is limited, wherein an expandability of the interface can be improved.

To accomplish the above object, according to the invention, there is provided an interface apparatus for connecting first and second hosts and a peripheral apparatus which are shared by the first and second hosts by a common bus interface, comprising: first connecting means for connecting the first host and the peripheral apparatus; second connecting means for connecting the second host and the peripheral apparatus; and connection control means for controlling in a manner such that while the first or second host is connected to the peripheral apparatus, when the first or second host which is not connected to the peripheral apparatus issues a request to connect to the peripheral apparatus, a response is generated to the host which issued the connection request as if the connection request was generated from the peripheral apparatus, thereby preventing that the connections from the first and second hosts to the peripheral apparatus compete.

By the above construction, according to the invention, when the first host and the peripheral apparatus are connected by a common bus interface or when the second host and the same peripheral apparatus are connected by a common bus interface, while the first or second host is connected to the peripheral apparatus, if the first or second host which is not connected to the peripheral apparatus issues a request to connect to the peripheral apparatus, a response is generated to the host which issued the connection request as if such a request was generated from the peripheral apparatus, thereby controlling so as not to compete the connections from the first and second hosts to the peripheral apparatus.

The above and other objects and features of the present invention will become apparent from the following detailed description and the appended claims with reference to the accompanying drawings.

BRIEF DESCRIPTION OF THE DRAWINGS

FIGS. 6A, 6B, and 6C are block diagrams showing various connection forms which are executed by the interface apparatus 4;

FIGS. 7A and 7B are diagrams showing procedures for returning a status in the case where a host 1 is connected to a copy apparatus 3 via the interface apparatus 4;

FIGS. 8A and 8B are flowcharts showing operations of an arbitrating process of an access competition in the interface apparatus 4 and the like;

DETAILED DESCRIPTION OF THE PREFERRED EMBODIMENTS

Preferred embodiments of the invention will now be described in detail hereinbelow with reference to the drawings.

Figure 1:
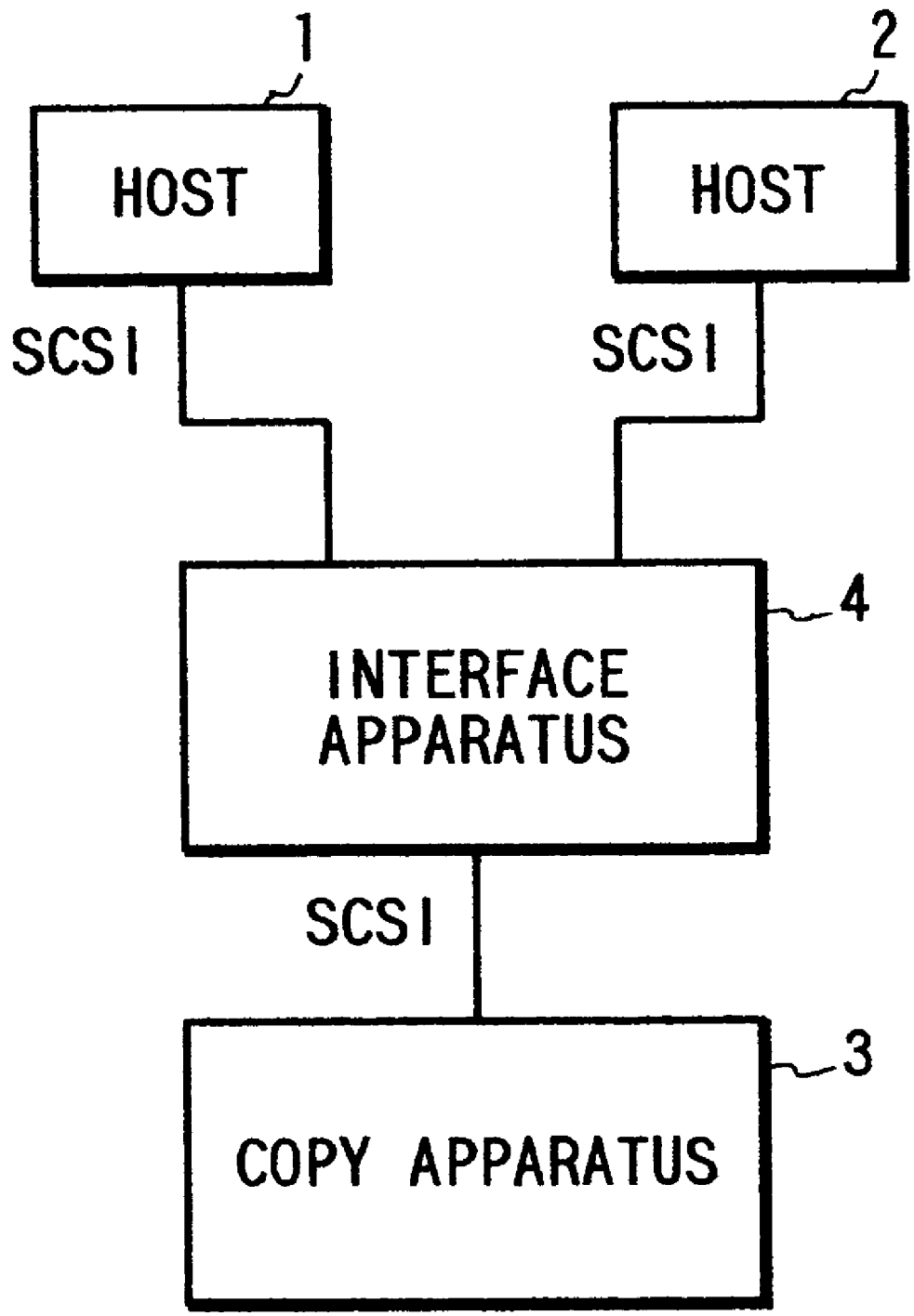
FIG. 1 is a block diagram showing a system environment in which an interface apparatus as a typical embodiment of the invention is used.

FIG. 1 is a block diagram showing a system environment in which an interface apparatus as a typical embodiment of the invention is used. In FIG. 1, reference numerals 1 and 2 denote hosts serving as initiators of the SCSI; 3 a peripheral apparatus (in the embodiment, a copy apparatus) which is shared by the hosts 1 and 2 serving as initiators and serves as a target of the SCSI; and 4 an interface apparatus having an SCSI bus switching function as an embodiment of the invention. The copy apparatus 3 has a scanner which can read an image original and a printer which can output an image. The interface apparatus 4 selects either one of the hosts 1 and 2 as initiators of the SCSI and connects the selected host to the copy apparatus 3 as a target of the SCSI.

Figure 2:
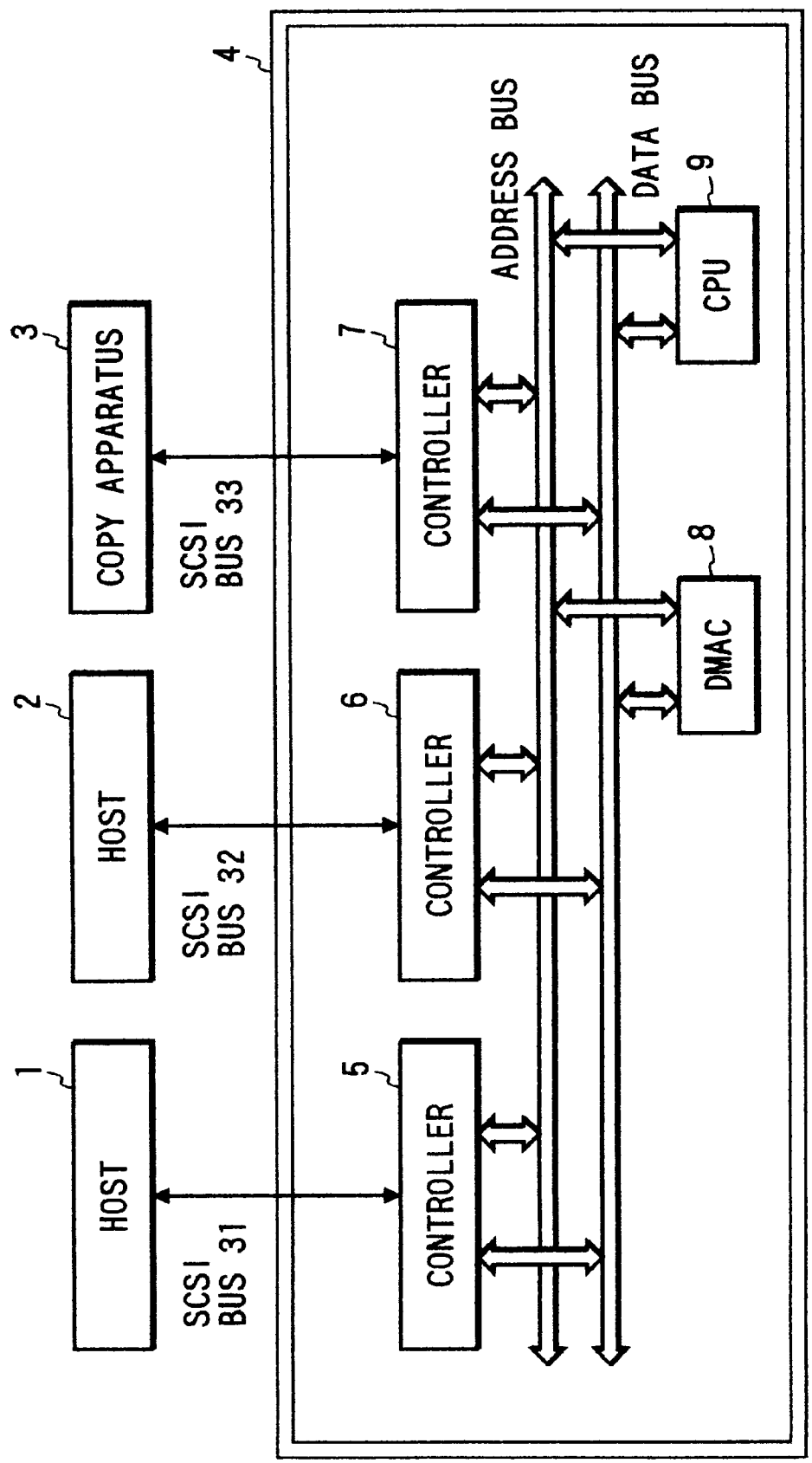
FIG. 2 is a block diagram showing a detailed construction of an interface apparatus 4.

FIG. 2 is a block diagram showing a detailed construction of the interface apparatus 4. In FIG. 2, reference numerals 5 to 7 denote controllers of an SCSI bus. The controller 5 is positioned as a target of an SCSI bus 31 and is connected to the host 1. The controller 6 is positioned as a target of an SCSI bus 32 and is connected to the host 2. The controller 7 is positioned as an initiator of an SCSI bus 33 and connects the copy apparatus 3 as a target. Reference numeral 9 denotes a CPU for controlling the controllers 5 to 7. Reference numeral 8 denotes a DMAC (direct memory access controller) for controlling so as to perform a data transfer between the controllers 5 and 7 or between the controllers 6 and 7 at a high speed (DMA transfer) without intervening the CPU 9. A case where the data transfer between the controllers 5 and 7 or between the controllers 6 and 7 is executed through the CPU 9 is referred to as an I/O transfer.

Figure 3:
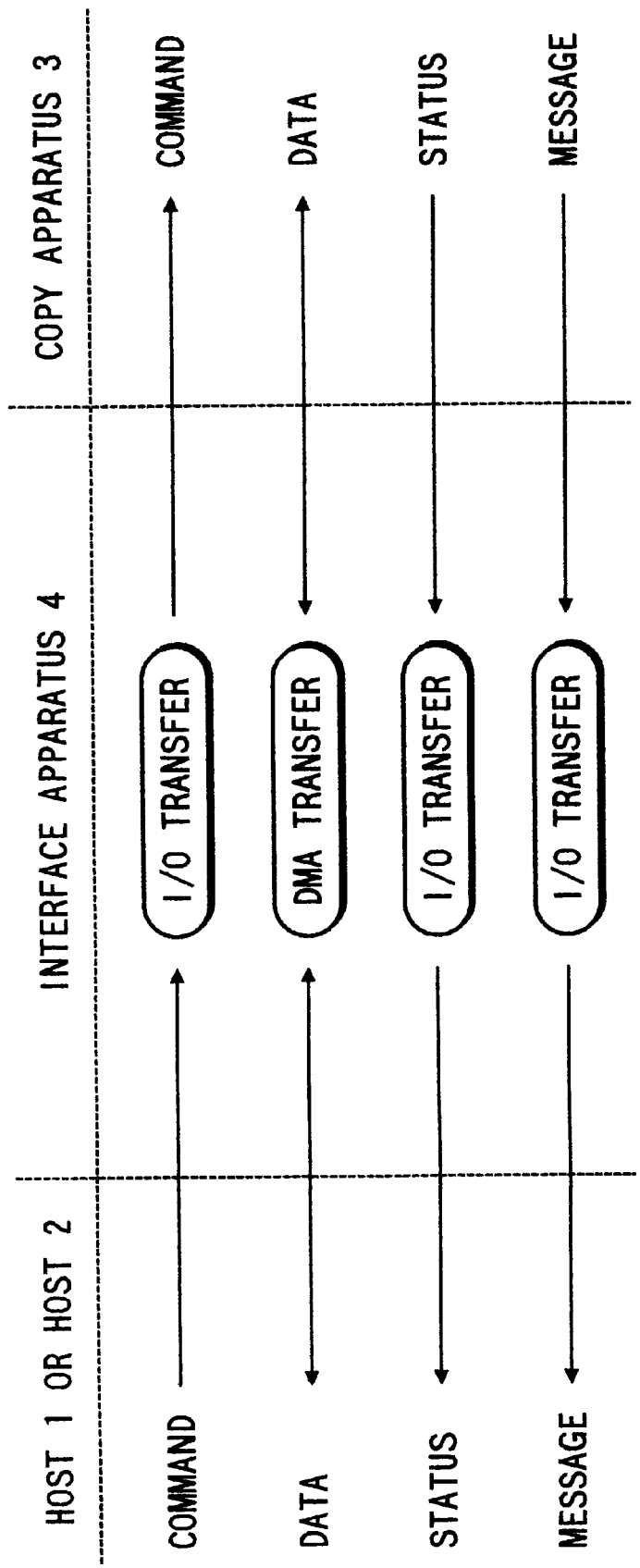
FIG. 3 is a block diagram showing a data transfer procedure which is executed by the interface apparatus 4.

FIG. 3 is a diagram showing a data transfer procedure which is executed by the interface apparatus 4. In the data transfer between the host 1 or 2 and the copy apparatus 3, as shown in FIG. 3, a command which is issued from the host 1 or 2 is transferred via the controller 5 or 6 to the copy apparatus 3 through the CPU 9 and controller 7 (I/O transfer).

The data formed by the hosts 1 and 2 and copy apparatus 3 is respectively transferred between the host 1 or 2 and the copy apparatus through the controllers 5 to 7 and DMAC 8 (DMA transfer). Further, a status and a message from the copy apparatus 3 are transferred via the controller 7 and CPU 9 to the host 1 or 2 through the controller 5 or 6 (I/O transfer).

In case of the I/O transfer, by setting a transfer unit to one byte, a capacity of an internal buffer (not shown) of the interface apparatus 4 can be minimized.

Figure 4:
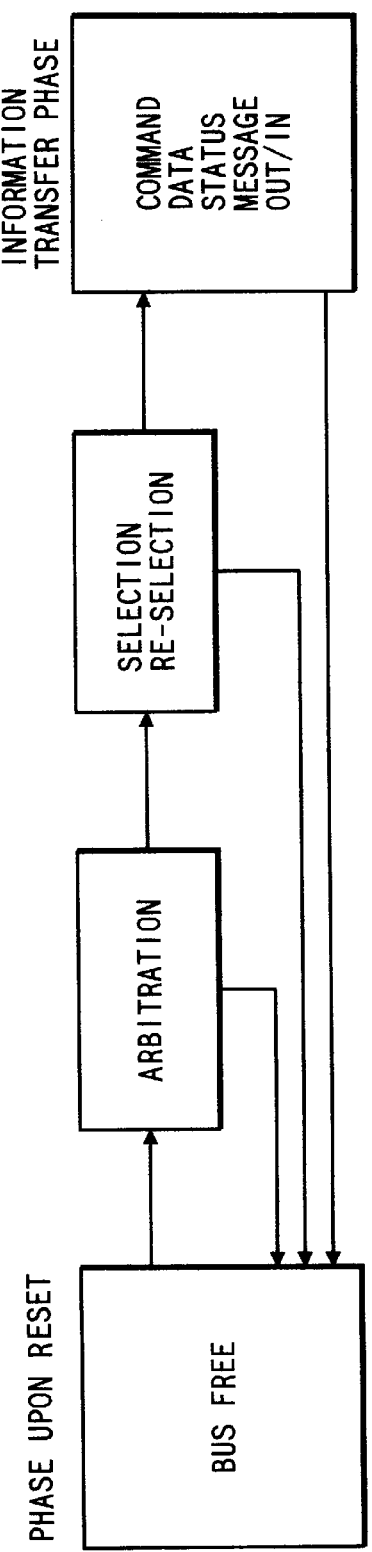
FIG. 4 is a block diagram showing a using state of an SCSI bus.

FIG. 4 is a block diagram showing a using state (hereinafter, referred to as a "phase") of an SCSI bus. As a phase, there are the following phases. Nine control signals BSY, SEL, C/D, I/O, MSG, REQ, ACK, ATN, and RST in the SCSI bus operate so as to denote "false" when they are at the high (H) level and "true" when they are at the low (L) level, respectively.

(a) Bus Free Phase

A state in which any apparatus doesn't use the SCSI bus. Just after a power source of the apparatus was turned on or just after the operation of the apparatus was reset, the apparatus enters this phase. As shown in FIG. 4, the apparatus can directly enter this phase from any other phases. The control signals BSY and SEL are at the H level.

(b) Arbitration Phase

A state in which a use right of the SCSI is captured. As shown in FIG. 4, the apparatus can enter this state from only the state of a bus free phase. The apparatus which wants to use the SCSI bus sets the control signal BSY into the L level and outputs an own apparatus number (ID) onto the SCSI data bus. After the control signal BSY was set to the L level, a check is made to see if the ID having a value larger than the own apparatus number is not outputted onto the SCSI data bus. In this instance, when there is no ID having a value larger than the own apparatus number, the apparatus gets the use right of the bus. When the apparatus obtains the use right, the apparatus sets the control signal SEL to the L level and enters a selection phase or a re-selection phase.

(c) Selection Phase

As shown in FIG. 4, the apparatus can enter this phase only from the arbitration phase. An initiator which obtains the use right of the bus by the arbitration phase outputs both of the own ID and an ID of an apparatus to which the initiator wants to access and sets the control signal BSY to the H level. If the apparatus to be accessed is in a connectable state, the initiator sets the control signal BSY to the L level and connects the apparatus. At this time, when confirming that there is a response to the control signal BSY, the initiator sets the control signal SEL to the H level.

The initiator sets the control signal ATN to the L level during the execution of the selection phase. Thus, the apparatus to be accessed is shifted from the selection phase to a message-out phase.

(d) Re-selection Phase

The apparatus can enter this phase only from the arbitration phase as shown in FIG. 4. Although this phase functions similarly to the selection phase, the apparatus (target) to be accessed selects the initiator which issued a command (such an operation is referred to as a "re-connect"). In this instance, the ID which is outputted from the apparatus to be accessed is only the initiator which is connected. When the re-selection phase is finished, the apparatus to be accessed is shifted to a message-in phase.

(e) Command Phase

A phase in which a command is sent from the initiator to the apparatus to which the initiator wants to access. To receive the command from the initiator, the apparatus to be accessed sets the control signals MSG and I/O to the H level, sets the control signal C/D to the L level, and enters this phase.

(f) Data Phase

A phase in which data is transferred between the initiator and the apparatus to which the initiator wants to access. When the data transfer is necessary by the execution of the command, the apparatus to be accessed sets the control signals MSG and C/D to the H level and enters this phase. Further, when the control signal I/O is at the low level, the apparatus to be accessed enters a data-in phase to input the data. When the control signal I/O is at the H level, the apparatus to be accessed enters the data-out phase.

(g) Status Phase

A phase in which the apparatus to be accessed sends the execution result of the command to the initiator. In order to send the status to the initiator, the apparatus to be accessed sets the control signal MSG to the H level and sets the control signals C/D and I/O to the L level and enters this phase. After the status data was transmitted, the apparatus to be accessed is shifted to a message-in phase.

(h) Message Phase

A phase in which a message is transferred between the initiator and the apparatus to which the initiator wants to access. The apparatus to be accessed in which the status phase is finished or the message phase is required by the control signal ATN during the selection phase sets the control signals MSG and C/D to the L level and enters the message phase.

Namely, when the status phase is finished, the apparatus to be accessed sets the control signal I/O to the L level and enters the message-in phase. When it is requested by the control signal ATN, the apparatus to be accessed sets the control signal I/O to the H level and enters a message-out phase.

Figure 5:
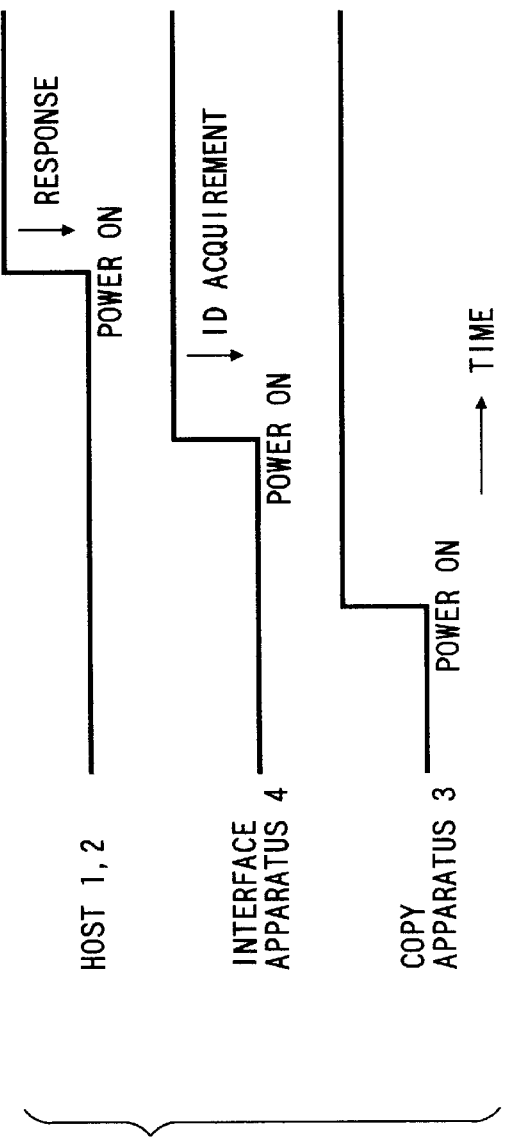
FIG. 5 is a diagram showing a power turn-on sequence of the system shown in FIG. 1.

FIG. 5 is a diagram showing a power turn-on sequence of the system shown in FIG. 1.

As shown in FIG. 5, first, a power source of the copy apparatus 3 as a target is turned on. A power source of the interface apparatus 4 is subsequently turned on. At this time point, the interface apparatus 4 obtains the apparatus number (ID) of the copy apparatus 3. Thus, the CPU 9 controls in a manner such that the ID of the SCSI bus which is recognized by the controllers 5 and 6 is equalized to the ID of the copy apparatus 3.

Further, when power sources of the hosts 1 and 2 are turned on, since those apparatuses capture the apparatus number (ID) of the copy apparatus 3, each of the hosts 1 and 2 recognizes that the same apparatus as a target, namely, the apparatus (copy apparatus 3) of the same ID is connected. As mentioned above, it falsely seems as if the hosts 1 and 2 independently recognize the copy apparatus 3 as a target. In other words, in the interface apparatus 4, an emulation of the copy apparatus 3 is executed as a target for the hosts 1 and 2.

FIGS. 6A to 6C are block diagrams showing various connection forms which are executed by the interface apparatus 4. In the embodiment, the following three states are considered: namely, (1) a state in which the hosts 1 and 2 do not connect the copy apparatus 3 and the SCSI bus is in a bus free state; (2) a state in which the host 1 connects the copy apparatus 3 and uses it (the host 1 is being used); and (3) a state in which the host 2 connects the copy apparatus 3 and uses it (the host 2 is being used).

(1) Bus Free State (FIG. 6A)

A state in which the hosts 1 and 2 are substantially in the bus free state and the host 1 is connected to the copy apparatus 3 through the controller 5, CPU 9, and controller 7 and the I/O transfer can be performed. The host 2 is set to the bus free state between the host 2 and the controller 6.

(2) The Host 1 is Being Used (FIG. 6B)

In this connection form, the host 1 is connected to the copy apparatus 3 through the controller 5, CPU 9 or DMAC 8, and controller 7 and the DMA transfer or I/O transfer can be performed. Now, assuming that the ID of the host 1 is set to "7" and the ID of the host 2 is set to "6" and the ID of the copy apparatus 3 is set to "2", in the interface apparatus 4, the copy apparatus 3 is emulated and operates in a manner such that the ID of the SCSI bus which is recognized by the controller 5 is set to "2", the ID of the SCSI bus which is recognized by the controller 6 is set to "2", and the ID of the SCSI bus which is recognized by the controller 7 is set to "7". Therefore, the host 1 and copy apparatus 3 are actually connected.

In the case where there is an access from the host 2 in a state in which the host 1 connects the copy apparatus 3 and uses it, the controller 6 emulates the copy apparatus 3 and transfers the same status as the status that is issued from the copy apparatus 3, for example, a status "Busy" indicating that the copy apparatus 3 is used by another host, or a status "Reservation Conflict" indicating that the copy apparatus 3 has been reserved by another host. Such a return of the statuses will be described in detail hereinlater.

When the host 1 enters the bus free state, the SCSI bus is returned to the bus free state. (3) The host 2 is being used (FIG. 6C)

In this connection form, the host 2 is connected to the copy apparatus 3 through the controller 6, CPU 9 or DMAC 8, and controller 7 and the DMA transfer or I/O transfer can be performed. Now, assuming that the ID of the host 1 is set to "7" and the ID of the host 2 is set to "6" and the ID of the copy apparatus 3 is set to "2", in the interface apparatus 4, the copy apparatus 3 is emulated and operates in a manner such that the ID of the SCSI bus which is recognized by the controller 5 is set to "2" and the ID of the SCSI bus which is recognized by the controller 6 is set to "2" and the ID of the SCSI bus which is recognized by the controller 7 is set to "6". Therefore, the host 2 and copy apparatus are actually connected.

On the other hand, in the case where there is an access from the host 2 in a state in which the host 1 connects the copy apparatus 3 and uses it, the controller 5 emulates the copy apparatus 3 and transfers the same status as the status which is issued from the copy apparatus 3, for example, a status "Busy" indicating that the copy apparatus is used by another host or a status "Reservation Conflict" indicating that the copy apparatus has been reserved by another host.

When the host 2 enters the bus free state, the SCSI bus is returned to the bus free state.

In the above connection states (2) and (3), when the hosts 1 and 2 use the same ID, information such as a "mode select" command or the like which was executed by one of the hosts cannot be distinguished from information from the other host and it is impossible to set "Unit Attention Sense Key" informing that mode information was changed, so that two hosts designate different IDs.

FIGS. 7A and 7B are diagrams showing a procedure to return the status in the case where the host 1 is connected to the copy apparatus 3 via the interface apparatus 4 (the case of FIG. 6B). FIGS. 7A and 7B show, particularly, which status the interface apparatus 4 returns in response to the access from the host 2 during the communication after the host 1 and copy apparatus 3 were connected.

First, as shown in FIG. 7A, when the host 1 occupies the copy apparatus 3 and is operating (until a reserve command is issued from the host 1 and the use right is captured and a release command is issued and the use right is released), even if the host 2 issues a select command and tries to use the copy apparatus 3, a status "Reservation Conflict" indicating that the acquirement of the use right is competed is returned from the interface apparatus 4 to the host 2. In this case, "Busy" can be also returned as a status of return. As shown in FIG. 7B, although the host 1 does not issue the reserve command, the host 1 issues the select command and uses the copy apparatus 3, even if the host 2 issues the select command and tries to use the copy apparatus 3, the status "Busy" indicating that the copy apparatus 3 is used is returned from the interface apparatus 4 to the host 2.

Figure 8A:
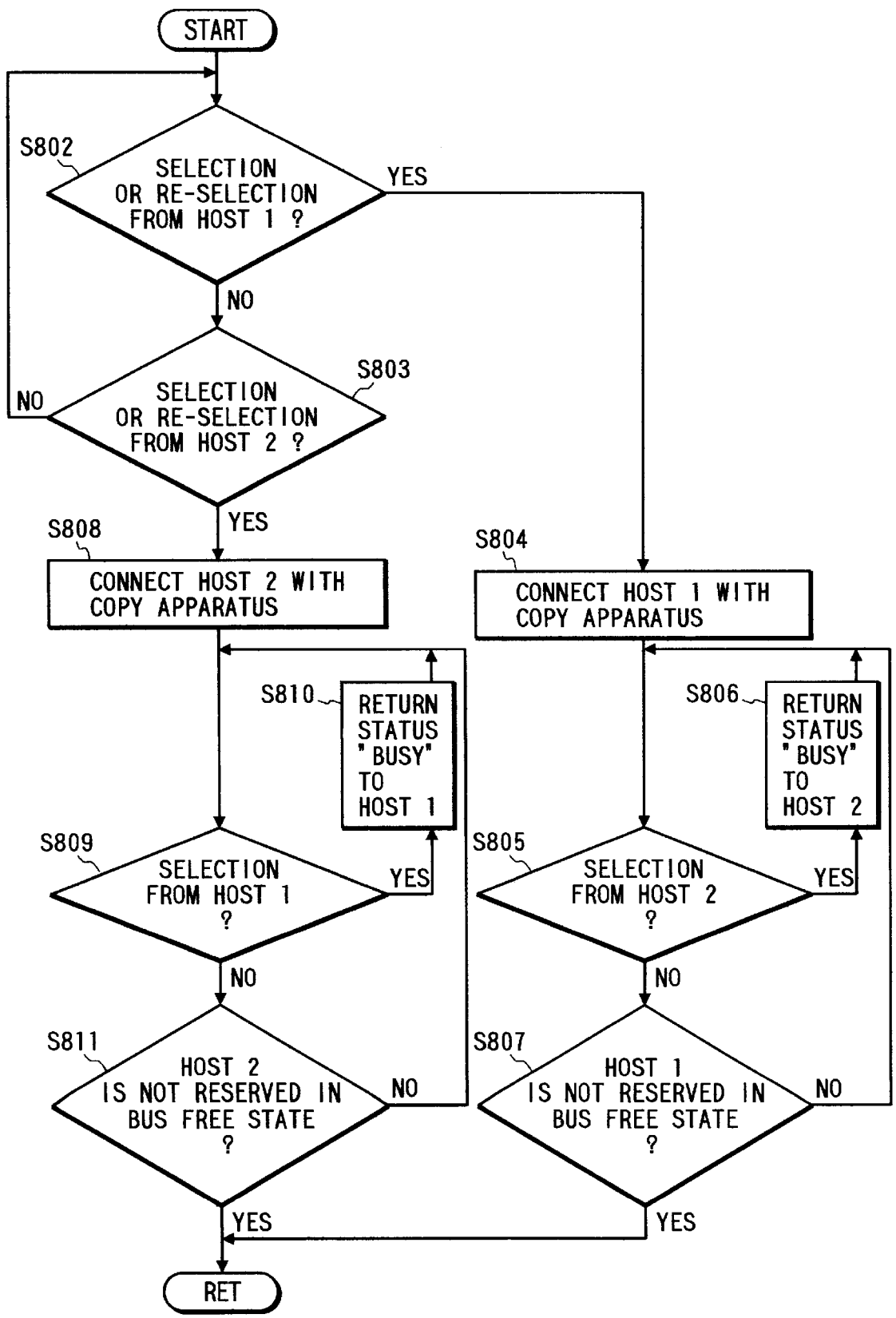

An arbitrating process of the access competition in the interface apparatus 4 which has the above construction and operates as mentioned above will now be described with reference to a flowchart shown in FIG. 8A. Explanation will now be made here on the assumption that the interface apparatus 4 is connected as shown in FIGS. 1 and 2 and that the using states of the SCSI buses 31 to 33 as shown in FIG. 6A are first at the bus free phase and the copy apparatus 3 is not reserved as a prerequisite.

First, in steps S802 and S803, the apparatus is in a waiting state of the selection from the hosts 1 and 2 and the re-selection from the copy apparatus 3. When the selection or the re-selection from the copy apparatus 3 to the host 1 is first issued from the host 1, the processing routine advances to step S804. The interface apparatus 4 issues the selection to the copy apparatus 3 or issues the re-selection to the host 1 and connects the host 1 and copy apparatus 3. Thus, the host 1 enters a state in which the I/0 transfer or DMA transfer can be performed between the host 1 and the copy apparatus 3 through the controller 5, CPU 9 or DMAC 8, and controller 7. After that, until a judgment result of "YES" in step S807 is obtained, the host 1 and copy apparatus 3 execute the operation at each phase other than the bus free phase or are set to the bus free phase in a state in which the copy apparatus 3 has been reserved. However, an explanation about such a phase control is omitted hereinbelow.

In step S805, a check is made to see if the selection has been issued from the host 2. When the selection is issued, the processing routine advances to step S806 and "Busy" is returned as status to the host 2. After that, the processing routine is returned to step S805. On the other hand, when the selection is not issued from the host 2, the processing routine advances to step S807 and a check is made to see if the host 1 has entered the bus free phase and has released the use right of the copy apparatus 3. When the host 1 is at the bus free phase and the copy apparatus 3 is not reserved, the processing routine is finished. When the host 1 is at the bus free phase or the copy apparatus 3 is reserved, the processing routine is returned to step S805.

In the processes in steps S802 to S803, when the selection or the re-selection from the copy apparatus 3 to the host 2 is first issued from the host 2, the processing routine advances to step S808 and the host 2 and copy apparatus 3 are connected in a manner similar to that mentioned above. Thus, the host 2 enters a state in which the I/O transfer or DMA transfer can be performed between the host 2 and the copy apparatus 3 through the controller 6, CPU 9 or DMAC 8, and controller 7.

In step S809, a check is made to see if the selection has been issued from the host 1. When the selection is issued, the processing routine advances to step S810 and "Busy" is returned as a status to the host 1. After that, the processing routine is returned to step S809. On the other hand, when the selection is not issued from the host 1, the processing routine advances to step S811 and a check is made to see if the host 2 has been set to the bus free phase and has released the use right of the copy apparatus 3. When the host 2 is at the bus free phase and doesn't reserve the copy apparatus 3, the processing routine is finished. When the host 2 is at the bus free phase or has reserved the copy apparatus 3, the processing routine is returned to step S809.

Although the status of "Busy" has been returned for the selection issued from the hosts 2 and 1 in the processes in steps S806 and S810, while the host 1 or 2 is obtaining the use right of the copy apparatus 3 (during the reservation), "Reservation Conflict" can be also returned as a status.

According to the embodiment, therefore, the interface apparatus 4 controls so that the apparatus which first issued the selection (or the apparatus which was re-selected) between the hosts 1 and 2 as two initiators connected to the interface apparatus 4 is connected to the copy apparatus 3 as a target. The interface apparatus 4 also returns a status of "Busy" for the selection that is issued from the other initiator during the connection and can control as if the connection with the copy apparatus 3 is not permitted.

In the embodiment, although a check is made to see whether the selection or re-selection has been issued or not in order to judge the presence or absence of the access to the initiator, the invention is not limited to such a case. For example, so long as the apparatus serving as an initiator supports the arbitration, the arbitration can be also judged.

Although the embodiment has been described with respect to the case where one apparatus (host 1 or 2) is connected to the SCSI bus 31 or 32, a plurality of apparatuses can be also connected. Ordinarily, although only up to eight apparatuses can be connected to the SCSI bus, according to the embodiment, up to seven (excluding the interface apparatus 4) apparatuses including the hosts 1 and 2 and the interface apparatus can be connected to each of the SCSI buses 31 and 32, the system can be expanded.

Another peripheral apparatus can be also used in place of the copy apparatus 3. The interface apparatus 4 can be also built in the apparatus. When the interface apparatus 4 is built in, the interface apparatus 4 and copy apparatus 3 are not necessarily connected by the SCSI interface. A network I/F or a facsimile apparatus can be also used in place of the host 1 or 2.

Further, the ID of the interface apparatus 4 on the SCSI bus 31 and the ID of the interface apparatus 4 on the SCSI bus 32 can be also individually set. The values of the IDs do not necessarily coincide with the ID of the copy apparatus 3.

In case of connecting the copy apparatus 3 and interface apparatus 4 by the SCSI bus, since the initiators which are connected to the SCSI buses 31 and 32 need to have the different IDs, the number of apparatuses which can be connected to the SCSI buses 31 and 32 is also reduced.

According to the embodiment, the hosts 1 and 2 which are connected to the SCSI buses 31 and 32 are not always necessary to correspond to the system construction of the multi-initiators. Namely, according to the embodiment, even initiators which do not correspond to the system construction of the multi-initiators can construct a system of the multi-initiators without causing a competition of the SCSI bus.

A modification of the embodiment will now be described.

Figure 8B:
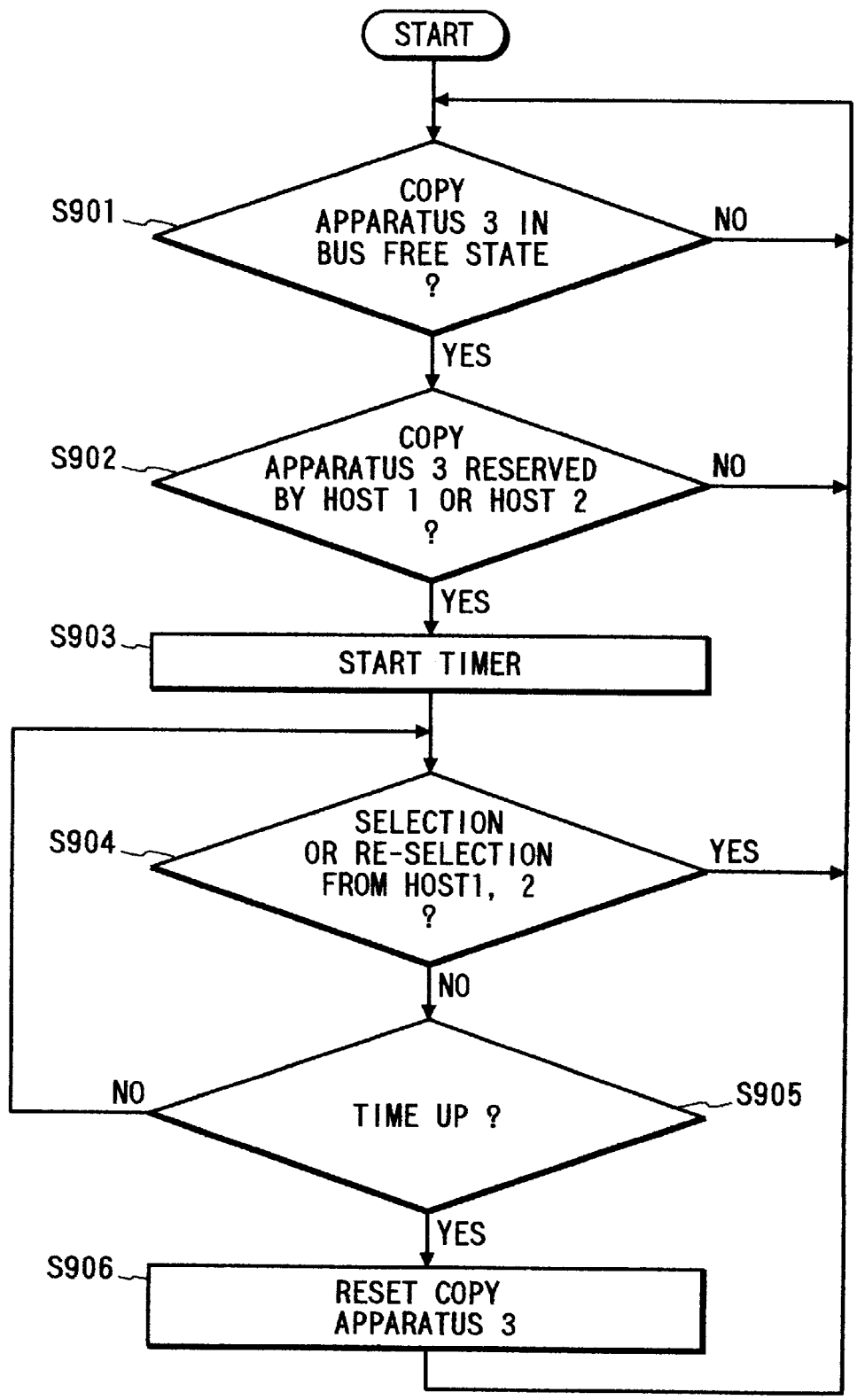

In the above embodiment, in the case where one of the hosts 1 and 2 does not release the copy apparatus 3, there is a fear such that the other host cannot access to the copy apparatus 3. In the modification, by executing the operation of FIG. 8B in parallel with the operation of FIG. 8A mentioned above, the occurrence of such a problem is prevented.

Namely, when the copy apparatus 3 is in the bus free state (step S901) and the copy apparatus 3 has been reserved by the host 1 or 2 (S902), a timer is started in step S903. In the case where the selection from the host which has reserved the copy apparatus 3 or the re-selection to the host is not issued until the timer times up (S904, S905), the copy apparatus 3 is reset (step S906).

Specifically speaking, in step S906, the interface apparatus 4 sets the control signal RST of the SCSI bus 33 to the L level, thereby resetting the copy apparatus 3 and releasing the reserved state.

After the interface apparatus 4 reset the copy apparatus 3, a response to commands from the hosts 1 and 2 is set to a status of "check condition" indicative of an abnormal end. In this case, "6h" (Unit Attention) is set into a sense key in sense data that is formed so as to be sent to the initiator and "29h" (Power on, reset, or bus device reset occurred) is set into additional sense data. Therefore, after the copy apparatus 3 was reset, when the hosts 1 and 2 first try to access to the copy apparatus, they can recognize that the copy apparatus 3 has been reset by the sense data.

A time-up time of the timer can be variably set by a dip switch or the like.

[Another embodiment]

Although the above embodiment has been described in a system environment such that two hosts are directly connected to the interface apparatus as a prerequisite, the access competition can be also smoothly adjusted even in a system environment such that the hosts are connected to the interface apparatus via the network.

Figure 9:
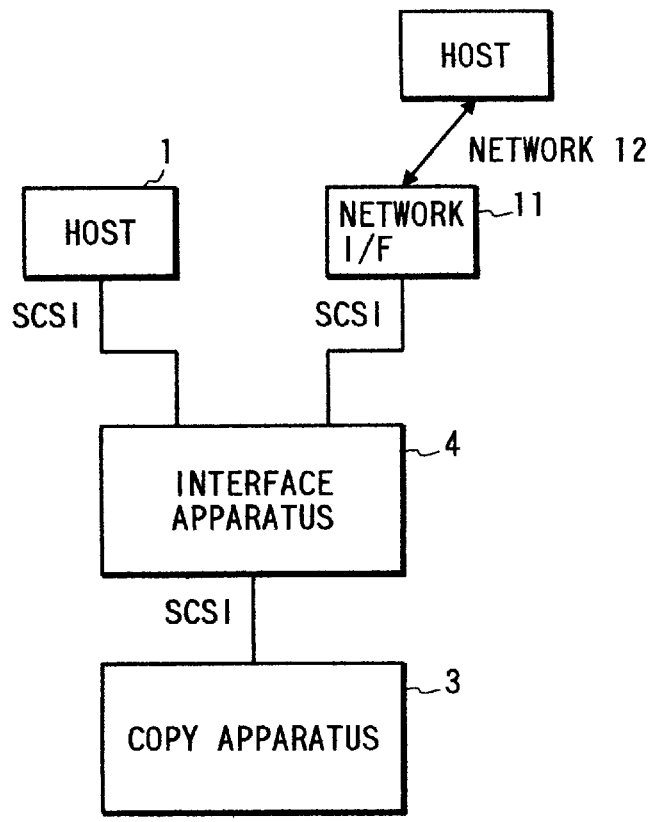
FIG. 9 is a block diagram showing a system environment of another embodiment in which an interface apparatus is used.
Figure 11:
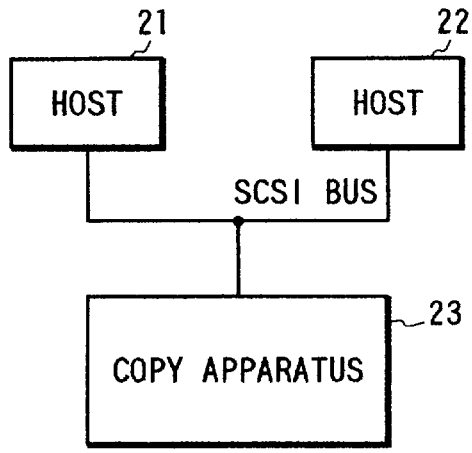
FIG. 11 is a diagram showing a connection state of a prior art.

A system environment as shown in FIG. 9 will now be considered. In this example, there are a network interface (I/F) 11 and the host 1 as initiators which are connected to the SCSI bus. Those initiators share the copy apparatus 3 as a target through the interface apparatus. In FIG. 9, the interface apparatus 4 is an apparatus having the same construction as that described in the foregoing embodiment and the same apparatuses as those described in the above embodiment are designated by the same reference numerals and their descriptions are omitted here.

Another host (not shown) is connected to the network interface (I/F) 11 through a network 12. A remote access can be performed from the host to the copy apparatus 3 via the network.

Figure 10:
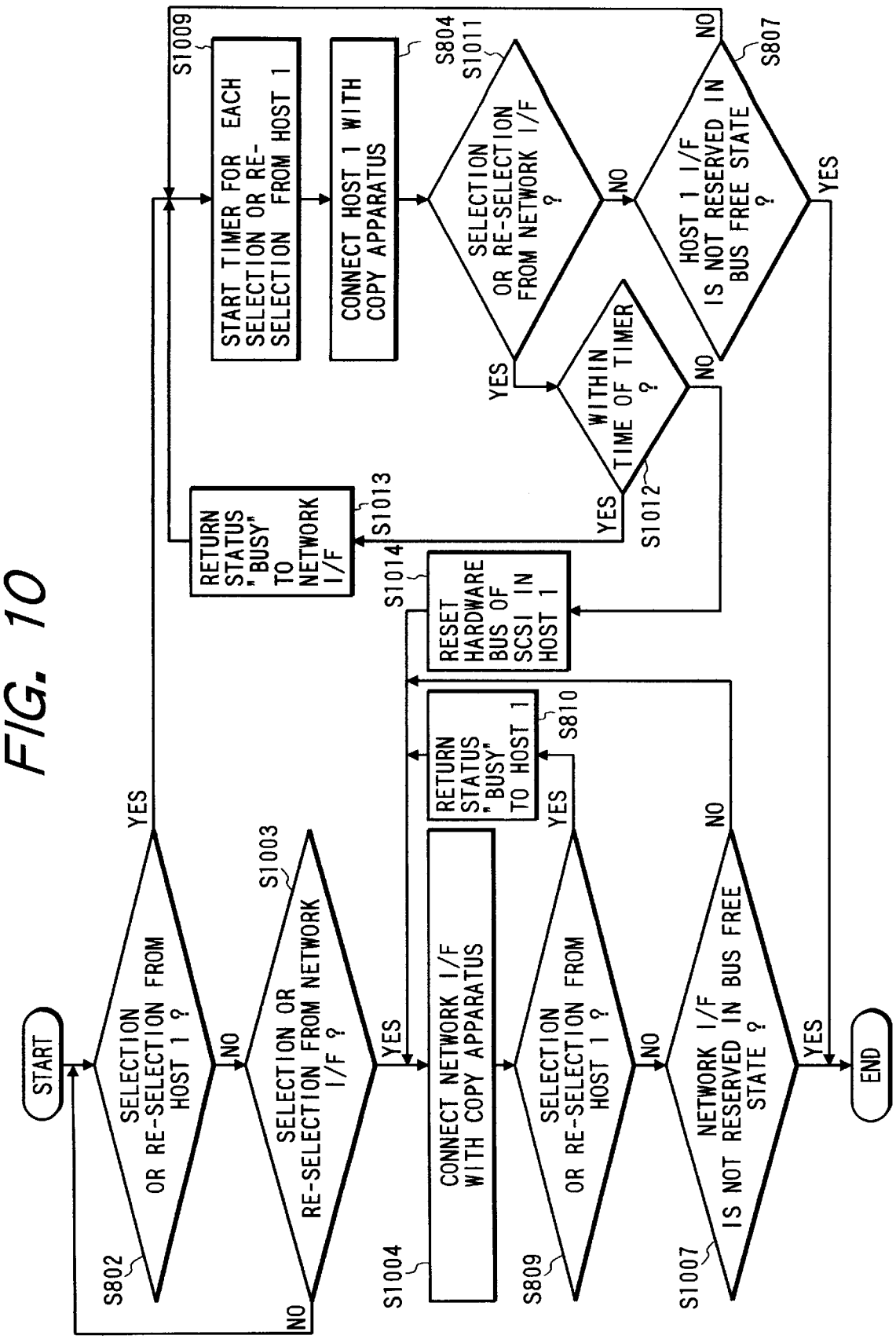
FIG. 10 is a flowchart showing an arbitrating process of an access competition according to another embodiment.

An arbitrating process of the access competition in the system environment as shown in FIG. 9 will now be described with reference to a flowchart shown in FIG. 10. In FIG. 10, the processing steps which are common to those described in the foregoing embodiment are designated by the same step reference numerals and their descriptions are omitted here.

In this instance, the connection from the network I/F 11 can be preferentially performed than the access from the host 1. In a manner similar to the foregoing embodiment, it is assumed that, at first, the using states of the SCSI bus from two initiators are at the bus free phase.

First, in steps S802 and S1003, the apparatus waits for the selection or re-selection from the host 1 and network I/F 11. When the selection or re-selection is first issued from the host 1, the processing routine advances to step S1009. On the other hand, when there is a request for a data reception such as a facsimile reception to the network I/F 11 through the network 12 and the selection or re-selection is issued from the network I/F 11 to the interface apparatus 4 earlier than the host 1, the processing routine advances to step S1004.

In step S1004, the network I/F 11 and copy apparatus 3 are connected. Thus, the network I/F 11 enters a state in which the I/O transfer or DMA transfer can be performed between the network I/F 11 and the copy apparatus 3 through the controller 6, CPU 9 or DMAC 8, and controller 7. The processes for the generation of the selection or re-selection from the host 1 during the connection between the network I/F 11 and the copy apparatus 3 are executed in steps S809 to S810 as mentioned in the foregoing embodiment. The processing routine is returned to step S1004. When there is no selection or re-selection from the host 1, the processing routine advances to step S1007 and a check is made to see if the network I/F 11 has been set to the bus free phase and has released the use right of the copy apparatus 3. When the network I/F 11 has released the use right of the copy apparatus 3 and is set to the bus free phase, the processing routine is finished. When the network I/F 11 is not at the bus free phase, the processing routine is returned to step S1004.

When the selection or re-selection is issued from the host 1 to the interface apparatus 4 earlier than the network I/F 11 and the processing routine advances to step S1009, first, the time monitor by the timer is started each time the selection or re-selection is issued from the host 1. After that, the host 1 and copy apparatus 3 are connected in step S804.

In step S1011, a check is made to see if the selection or re-selection has been issued from the network I/F 11 during the connection of the host 1 and copy apparatus 3. When the selection or re-selection is issued, the processing routine advances to step S1012. Further, a check is made to see if an elapsed time (T) after the host 1 had issued the selection or re-selection and the time monitor by the timer was started is equal to or shorter than a predetermined time (Tth) or not. When T≦Tth, the processing routine advances to step S1013 and "Busy" is returned as a status to the network I/F 11. After that, the processing routine is returned to step S1009. On the other hand, when T>Tth (namely, when the elapsed time exceeds the predetermined time), the processing routine advances to step S1014. A hardware resetting process is performed to the controller 5 to which the host 1 is connected and the phase is forcedly returned to the bus free phase, thereby releasing the use right of the host 1. After that, the processing routine advances to step S1004.

In the process in step S1011, when the selection or re-selection is not issued from the network I/F 11 during the connection between the host 1 and copy apparatus 3, the processing routine advances to step S807. In a manner similar to the foregoing embodiment, a check is made to see if the host 1 has been set to the bus free phase and has released the use right of the copy apparatus 3. In accordance with the judgment result, when the host 1 is at the bus free phase, the processing routine is finished. When the host 1 is not at the bus free phase, the processing routine is returned to step S1009.

According to the embodiment, therefore, it is possible to control in a manner such that when there is an access from the network I/F 11, even if the host 1 is connected to the copy apparatus 3 and has the use right of the copy apparatus 3, so long as a predetermined time has elapsed after the selection or re-selection was issued, the use right is forcedly released, thereby enabling the network I/F 11 and copy apparatus 3 to be connected. Thus, it is possible to preferentially control the access from a specific initiator (network I/F here) than an access from another initiator (host here). A facsimile apparatus can be also used in place of the host which is connected to the network. In such a case, the network I/F 11 has a facsimile function. The interface apparatus 4 and network I/F 11 can be also constructed in one casing. The invention is not limited to the SCSI interface but can be also applied to not only the SCSI buses 31 and 32 or the like but also other interfaces.

The invention can be applied to a system constructed by a plurality of equipment or can be also applied to an apparatus constructed by one equipment.

The invention can be also applied to a case where it is accomplished by supplying a program to a system or an apparatus. In the invention, a printer can be employed in place of the copy apparatus.

According to the invention as described above, when the first host and peripheral apparatus are connected by a common bus interface or when the second host and the same peripheral apparatus are connected by a common bus interface, while the first or second host is connected to the peripheral apparatus, if the first or second host which is not connected to the peripheral apparatus issues a request to connect to the peripheral apparatus, a response is outputted to the host which requested the connection as if such a request was performed from the peripheral apparatus, thereby controlling so as not to compete the connections from the first and second hosts to the peripheral apparatus. Therefore, there is an effect such that the connection competition to the shared peripheral apparatus is adjusted and a smooth access can be executed.

The present invention is not limited to the foregoing embodiments but many modifications and variations are possible within the spirit and scope of the appended claims of the invention.

What is claimed is:

1. An interface apparatus for connecting first and second hosts and a peripheral apparatus shared by the first and second hosts by means of a common bus interface, said apparatus comprising:

first connecting means for connecting the first host and the peripheral apparatus;

second connecting means for connecting the second host and the peripheral apparatus; and connection control means for controlling such that while one from among the first or second host is connected to the peripheral apparatus, when another from among the first or second host that is not connected to the peripheral apparatus issues a request to connect to the peripheral apparatus, a response is outputted to the host that issued the connection request as if such a response was generated from the peripheral apparatus, thereby preventing connection requests from the first and second hosts to the peripheral apparatus from conflicting with one another.

2. An apparatus according to claim 1, wherein said connection control means includes emulation means for emulating the peripheral apparatus.

3. An apparatus according to claim 2, wherein said emulation means executes emulation of the peripheral apparatus to the other from among the first or second host.

4. An apparatus according to claim 1, wherein the common bus interface includes an SCSI interface.

5. An apparatus according to claim 1, wherein the second host is an apparatus which is connected through a network, and further has network interface means for connection with the network.

6. An apparatus according to claim 5, wherein the second host which is connected through the network is a facsimile apparatus.

7. An apparatus according to claim 5, further having preferential control means for controlling said interface apparatus so as to ensure that the connection request from the second host which is connected through the network is preferentially performed.

8. An apparatus according to claim 7, wherein said preferential control means includes:

comparing means for comparing whether a time for the connection exceeds a predetermined time if the first host has already been connected to the peripheral apparatus when the connection request from the second host occurs; and forced disconnecting and connecting means for forcedly disconnecting said connection in accordance with a comparison result of said comparing means and for performing the connection with the second host which is connected through the network.

9. An apparatus according to claim 1, wherein the peripheral apparatus is a printer apparatus.

10. An apparatus according to claim 1, wherein the response from said connection control means includes information indicating that the peripheral apparatus is being used and information indicating that the connection requests to the peripheral apparatus conflict with one another.

11. A connection apparatus comprising:

first connecting means for connecting a first apparatus;

second connecting means for connecting a second apparatus;

third connecting means for connecting a peripheral apparatus; and emulation means for emulating the peripheral apparatus connected by said third connecting means by outputting predetermined status data, which would normally be issued by the peripheral apparatus, through said second connecting means to the second apparatus when a connection request is received from the second apparatus when the first apparatus is connected to the peripheral apparatus.

12. An apparatus according to claim 11, wherein said first and second connecting means are respectively connected to the first and second apparatuses through first and second SCSI interfaces.

13. An apparatus according to claim 12, wherein the first and second apparatuses operate as initiators of first and second SCSI interfaces, respectively.

14. An apparatus according to claim 13, wherein said third connecting means is connected to the peripheral apparatus through a third SCSI interface and the peripheral apparatus operates as an initiator of the third SCSI interface.

15. An apparatus according to claim 11, wherein the second apparatus is connected to a network.

16. An apparatus according to claim 15, further including preferential control means for controlling said connection apparatus so as to ensure that the connection request from the second apparatus is preferentially performed.

17. An apparatus according to claim 16, wherein said preferential control means includes:

comparing means for comparing whether a connection time with the first apparatus exceeds a predetermined time when there is a connection request from the second apparatus while the first apparatus and the peripheral apparatus are connected; and disconnecting and connecting means for disconnecting the connection with the first apparatus in accordance with a comparison result of said comparing means and performing the connection with the second apparatus.

18. An apparatus according to claim 11, wherein the second apparatus is a facsimile apparatus.

19. An apparatus according to claim 11, wherein the peripheral device is a printer apparatus.

20. An apparatus according to claim 11, wherein the predetermined status data includes information indicating that the peripheral apparatus is being used and information indicating that the connection requests to the peripheral apparatus are in conflict with one another.

21. An apparatus according to claim 11, further having:

means for detecting that no access to the peripheral apparatus has occurred from one from among the first and second apparatuses that has reserved the peripheral apparatus for a predetermined time when the peripheral apparatus has been reserved by the one of the first and second apparatuses; and means for releasing the reserved state of the peripheral apparatus in accordance with a detection of said detecting means.

22. An apparatus according to claim 21, wherein said emulation means executes the emulation of the peripheral apparatus to whichever of the first or second apparatuses is not connected to peripheral apparatus.

23. An apparatus according to claim 21, wherein said releasing means has means for resetting the peripheral apparatus.

24. An apparatus according to claim 23, further having means for notifying the first and second apparatuses that the peripheral apparatus was reset by said resetting means.

25. An apparatus comprising:

first connecting means for connecting a first apparatus;

second connecting means for connecting a second apparatus; and control means for, even if a reserve command has been received from the first apparatus, allowing said second connecting means to connect the second apparatus without receiving a release command from the first apparatus.

26. An apparatus according to claim 25, further comprising:
   third connecting means for connecting a peripheral apparatus; and
   emulation means for emulating the peripheral apparatus.

27. An apparatus according to claim 25, further comprising a peripheral apparatus.

28. An apparatus according to claim 25, wherein said first and second connecting means are respectively connected to the first and second apparatuses through first and second interfaces.

29. An apparatus according to claim 28, wherein the first and second apparatuses operate as initiators of first and second SCSI interfaces, respectively.

30. An apparatus according to claim 25, wherein third connecting means is connected to a peripheral apparatus through a third SCSI interface and the peripheral apparatus operates as an initiator of the third SCSI interface.

31. An apparatus according to claim 25, wherein the second apparatus comprises one of an apparatus connected to a network and a facsimile apparatus.

32. An apparatus according to claim 25, further comprising comparing means for comparing whether a reserved time by the first apparatus exceeds a predetermined time when without a connection request from the first apparatus, wherein said control means resets said first connecting means so as to allow said second connecting means to connect the second apparatus in accordance with a comparison result of said comparing means.

33. An apparatus according to claim 32, wherein when a connection request is received from the second apparatus before the reserved time exceeds the predetermined time, predetermined status data is transmitted to the second apparatus, the predetermined status data including information which indicates that a peripheral apparatus is being used or that connection requests from the first and second apparatuses are in conflict with one another.

34. An apparatus according to claim 32, further comprising means for notifying the first and second apparatuses that a peripheral apparatus was reset by said control means.

35. A method of operating at interface apparatus for connecting first and second hosts and a peripheral apparatus shared by the first and second hosts by means of a common bus interface, said method comprising:
   a first connecting step of connecting the first host and the peripheral apparatus;
   a second connecting step of connecting the second host and the peripheral apparatus; and
   a connection control step of controlling such that while one from among the first or second host is connected to the peripheral apparatus, when another from among the first or second host that is not connected to the peripheral apparatus issues a request to connect to the peripheral apparatus, a response is outputted to the host that issued the connection request as if such a response was generated from the peripheral apparatus, thereby preventing connection requests from the first and second hosts to the peripheral apparatus from conflicting with one another.

36. A method according to claim 35, wherein said connection control step includes an emulation step of emulating the peripheral apparatus.

37. A method according to claim 36, wherein said emulation step executes emulation of the peripheral apparatus to the other from among the first or second host.

38. A method according to claim 35, wherein the common bus interface includes an SCSI interface.

39. A method according to claim 35, wherein the second host is an apparatus which is connected through a network, and further has network interface means for connection with the network.

40. A method according to claim 39, wherein the second host which is connected through the network is a facsimile apparatus.

41. A method according to claim 39, further having a preferential control step of controlling the interface apparatus so as to ensure that the connection request from the second host which is connected through the network is preferentially performed.

42. A method according to claim 41, wherein said preferential control step includes:
   a comparing step of comparing whether a time for the connection exceeds a predetermined time if the first host has already been connected to the peripheral apparatus when the connection request from the second host occurs; and
   a forced disconnecting and connecting step of forcedly disconnecting said connection in accordance with a comparison result of said comparing step and of performing the connection with the second host which is connected through the network.

43. A method according to claim 35, wherein the peripheral apparatus is a printer apparatus.

44. A method according to claim 35, wherein the response from said connection control step includes information indicating that the peripheral apparatus is being used and information indicating that the connection requests to the peripheral apparatus conflict with one another.

45. A method of operating a connection apparatus, comprising:
   a first connecting step of connecting a first apparatus;
   a second connecting step of connecting a second apparatus;
   a third connecting step of connecting a peripheral apparatus; and
   an emulation step of emulating the peripheral apparatus connected in said third connecting step by outputting predetermined status data, which would normally be issued by the peripheral apparatus, at said second connecting step to the second apparatus when a connection request is received from the second apparatus when the first apparatus is connected to the peripheral apparatus.

46. A method according to claim 45, wherein said first and second connecting steps respectively connect to the first and second apparatuses using first and second SCSI interfaces.

47. A method according to claim 46, wherein the first and second apparatuses operate as initiators of first and second SCSI interfaces, respectively.

48. A method according to claim 47, wherein said third connecting step connects to the peripheral apparatus through a third SCSI interface and the peripheral apparatus operates as an initiator of the third SCSI interface.

49. A method according to claim 45, wherein the second apparatus is connected to a network.

50. A method according to claim 45, wherein the second apparatus is a facsimile apparatus.

51. A method according to claim 50, further including a preferential control step of controlling the connection apparatus so as to ensure that the connection request from the second apparatus is preferentially performed.

52. A method according to claim 51, wherein said preferential control step includes:

a comparing step of comparing whether a connection time with the first apparatus exceeds a predetermined time when there is a connection request from the second apparatus while the first apparatus and the peripheral apparatus are connected; and a disconnecting and connecting step of disconnecting the connection with the first apparatus in accordance with a comparison result of said comparing step and performing the connection with the second apparatus.

53. A method according to claim 45, wherein the peripheral device is a printer apparatus.

54. A method according to claim 45, wherein the predetermined status data includes information indicating that the peripheral apparatus is being used and information indicating that the connection requests to the peripheral apparatus are in conflict with one another.

55. A method according to claim 45, further having:

a detecting step of detecting that no access to the peripheral apparatus has occurred from one from among the first and second apparatuses that has reserved the peripheral apparatus for a predetermined time when the peripheral apparatus has been reserved by the one of the first and second apparatuses; and a releasing step of releasing the reserved state of the peripheral apparatus in accordance with a detection of said detecting step.

56. A method according to claim 55, wherein said releasing step includes a resetting step of resetting the peripheral apparatus.

57. A method according to claim 56, wherein said emulation step executes the emulation of the peripheral apparatus to whichever of the first or second apparatuses is not connected to the peripheral apparatus.

58. A method according to claim 56, further having a notifying step of notifying the first and second apparatuses that the peripheral apparatus was reset by said resetting step.

59. A connecting method comprising:

a first connecting step of connecting a first apparatus;

a second connecting step of connecting a second apparatus; and a control step of, even if a reserve command has been received from the first apparatus, allowing said second connecting step to connect the second apparatus without receiving a release command from the first apparatus.

60. A method according to claim 59, further comprising:

a third connecting step of connecting a peripheral apparatus; and an emulation step of emulating the peripheral apparatus.

61. A method according to claim 59, further comprising a step of providing a peripheral apparatus.

62. A method according to claim 59, wherein said first and second connecting steps respectively connect to the first and second apparatuses through first and second interfaces.

63. A method according to claim 62, wherein the first and second apparatuses operate as initiators of first and second SCSI interfaces, respectively.

64. An apparatus according to claim 59, wherein a third connecting step connects to a peripheral apparatus through a third SCSI interface and the peripheral apparatus operates as an initiator of the third SCSI interface.

65. A method according to claim 59, wherein the second apparatus comprises one of an apparatus connected to a network and a facsimile apparatus.

66. A method according to claim 59, further comprising a comparing step of comparing whether a reserved time by the first apparatus exceeds a predetermined time when without a connection request from the first apparatus, wherein said control step resets said first connecting step so as to allow said second connecting step to connect the second apparatus in accordance with a comparison result of said comparing step.

67. A method according to claim 66, wherein when a connection request is received from the second apparatus before the reserved time exceeds the predetermined time, predetermined status data is transmitted to the second apparatus, the predetermined status data including information which indicates that a peripheral apparatus is being used or that connection requests from the first and second apparatuses are in conflict with one another.

68. A method according to claim 66, further comprising a notifying step of notifying the first and second apparatuses that a peripheral apparatus was reset by said control step.

69. A system including first and second hosts, a peripheral apparatus and an interface apparatus for connecting said first and second hosts and said peripheral apparatus shared by said first and second hosts by means of a common bus interface, said interface apparatus comprising:

first connecting means for connecting said first host and said peripheral apparatus;

second connecting means for connecting said second host and said peripheral apparatus; and connection control means for controlling such that while one from among said first or second host is connected to said peripheral apparatus, when another from among said first or second host that is not connected to said peripheral apparatus issues a request to connect to said peripheral apparatus, a response is outputted to said host that issued the connection request as if such a response was generated from said peripheral apparatus, thereby preventing connection requests from said the first and second hosts to said peripheral apparatus from conflicting with one another.

70. A system according to claim 69, wherein said connection control means includes emulation means for emulating said peripheral apparatus.

71. A system according to claim 70, wherein said emulation means executes emulation of said peripheral apparatus to the other from among said first or second host.

72. A system according to claim 69, wherein the common bus interface includes an SCSI interface.

73. A system according to claim 69, wherein said second host is an apparatus which is connected through a network, and further has network interface means for connection with the network.

74. A system according to claim 73, wherein said second host which is connected through the network is a facsimile apparatus.

75. A system according to claim 73, further having preferential control means for controlling said interface apparatus so as to ensure that the connection request from said second host which is connected through the network is preferentially performed.

76. A system according to claim 75, wherein said preferential control means includes:

comparing means for comparing whether a time for the connection exceeds a predetermined time if said first host has already been connected to said peripheral apparatus when the connection request from said second host occurs; and forced disconnecting and connecting means for forcedly disconnecting said connection in accordance with a comparison result of said comparing means and for performing the connection with said second host which is connected through the network.

77. A system according to claim 69, wherein said peripheral apparatus is a printer apparatus.

78. A system according to claim 69, wherein the response from said connection control means includes information indicating that said peripheral apparatus is being used and information indicating that the connection requests to said peripheral apparatus conflict with one another.

79. A system including a first apparatus, a second apparatus and a connection apparatus, said connection apparatus comprising:

first connecting means for connecting said first apparatus;

second connecting means for connecting said second apparatus;

third connecting means for connecting said peripheral apparatus; and emulation means for emulating the peripheral apparatus connected by said third connecting means by predetermined status data, which would normally be issued by the peripheral apparatus, through said second connecting means to said second apparatus when a connection request is received from said second apparatus when said first apparatus is connected to said peripheral apparatus.

80. A system according to claim 79, wherein said first and second connecting means are respectively connected to said first and second apparatuses through first and second SCSI interfaces.

81. A system according to claim 80, wherein said first and second apparatuses operate as initiators of first and second SCSI interfaces, respectively.

82. A system according to claim 81, wherein said third connecting means is connected to said peripheral apparatus through a third SCSI interface and said peripheral apparatus operates as an initiator of said third SCSI interface.

83. A system according to claim 79, wherein said second apparatus is connected to a network.

84. A system according to claim 83, further including preferential control means for controlling said connection apparatus so as to ensure that the connection request from said second apparatus is preferentially performed.

85. A system according to claim 84, wherein said preferential control means includes:

comparing means for comparing whether a connection time with said first apparatus exceeds a predetermined time when there is a connection request from said second apparatus while said first apparatus and said peripheral apparatus are connected; and disconnecting and connecting means for disconnecting the connection with said first apparatus in accordance with a comparison result of said comparing means and performing the connection with said second apparatus.

86. A system according to claim 79, wherein said second apparatus is a facsimile apparatus.

87. A system according to claim 79, wherein said peripheral device is a printer apparatus.

88. A system according to claim 79, wherein the predetermined status data includes information indicating that said peripheral apparatus is being used and information indicating that the connection requests to said peripheral apparatus are in conflict with one another.

89. A system according to claim 79, further having:

means for detecting that no access to said peripheral apparatus has occurred from one from among said first and second apparatuses that has reserved said peripheral apparatus for a predetermined time when said peripheral apparatus has been reserved by the one of said first and second apparatuses; and means for releasing the reserved state of said peripheral apparatus in accordance with a detection of said detecting means.

90. A system according to claim 89, wherein said emulation means executes the emulation of said peripheral apparatus to whichever of said first or second apparatuses is not connected to said peripheral apparatus.

91. A system according to claim 89, wherein said releasing means has means for resetting said peripheral apparatus.

92. A system according to claim 91, further having means for notifying said first and second apparatuses that said peripheral apparatus was reset by said resetting means.

93. A system comprising a first apparatus, a second apparatus and a connecting apparatus, said connecting apparatus comprising:

first connecting means for connecting said first apparatus;

second connecting means for connecting said second apparatus; and control means for, even if a reserve command has been received from said first apparatus, allowing said second connecting means to connect said second apparatus without receiving a release command from said first apparatus.

94. A system according to claim 93, further comprising:

a peripheral apparatus;

third connecting means for connecting said peripheral apparatus; and emulation means for emulating said peripheral apparatus.

95. A system according to claim 93, further comprising a peripheral apparatus.

96. A system according to claim 93, wherein said first and second connecting means are respectively connected to said first and second apparatuses through first and second interfaces.

97. A system according to claim 96, wherein said first and second apparatuses operate as initiators of first and second SCSI interfaces, respectively.

98. A system according to claim 93, wherein third connecting means is connected to a peripheral apparatus through a third SCSI interface and said peripheral apparatus operates as an initiator of the third SCSI interface.

99. A system according to claim 93, wherein said second apparatus comprises one of an apparatus connected to a network and a facsimile apparatus.

100. A system according to claim 93, further comprising comparing means for comparing whether a reserved time by said first apparatus exceeds a predetermined time without a connection request from said first apparatus, wherein said control means resets said first connecting means so as to allow said second connecting means to connect said second apparatus in accordance with a comparison result of said comparing means.

101. A system according to claim 100, wherein when a connection request is received from said second apparatus before the reserved time exceeds the predetermined time, predetermined status data is transmitted to the second apparatus, the predetermined status data including information which indicates that a peripheral apparatus is being used or that connection requests from said first and second apparatuses are in conflict with one another.

102. A system according to claim 100, further comprising means for notifying said first and second apparatuses that a peripheral apparatus was reset by said control means.

* * * * *

UNITED STATES PATENT AND TRADEMARK OFFICE
CERTIFICATE OF CORRECTION

PATENT NO.  : 5,961,624

DATED       : October 5, 1999

INVENTOR(S) : MAKOTO TAKAYAMA

It is certified that error appears in the above-identified patent and that said Letters Patent is hereby corrected as shown below:

COLUMN 2

Line 18, "pete" should read --pete between--.

COLUMN 3

Line 51, "any apparatus doesn't" should read
     --no apparatuses--.

COLUMN 8

Line 46, "reset" should read --resets--.

COLUMN 10

Line 54, "compete" should read --compete between--.

UNITED STATES PATENT AND TRADEMARK OFFICE
CERTIFICATE OF CORRECTION

PATENT NO. : 5,961,624
DATED : October 5, 1999
INVENTOR(S) : MAKOTO TAKAYAMA

It is certified that error appears in the above-identified patent and that said Letters Patent is hereby corrected as shown below:

COLUMN 10

Line 54, "compete" should read --compete between--.

Signed and Sealed this

Thirteenth Day of June, 2000

Attest:

Q. TODD DICKINSON

Attesting Officer    Director of Patents and Trademarks